(12) United States Patent
Ausserlechner (10) Patent No.: US 10,533,835 B2
(45) Date of Patent: Jan. 14, 2020

(54) ANGLE SENSOR ARRANGEMENT AND METHOD FOR THE ANGLE SENSOR ARRANGEMENT

(71) Applicant: Infineon Technologies AG, Neubiberg (DE)

(72) Inventor: Udo Ausserlechner, Villach (AT)

(73) Assignee: Infineon Technologies AG, Neubiberg (DE)

( * ) Notice: Subject to any disclaimer, the term of this patent is extended or adjusted under 35 U.S.C. 154(b) by 83 days.

(21) Appl. No.: 15/591,746

(22) Filed: May 10, 2017

(65) Prior Publication Data

US 2017/0328701 A1 Nov. 16, 2017

(30) Foreign Application Priority Data

May 12, 2016 (DE) .......................... 10 2016 108 846

(51) Int. Cl.
*G01B 7/30* (2006.01)
*G01B 7/004* (2006.01)
*G01D 5/14* (2006.01)

(52) U.S. Cl.
CPC .............. *G01B 7/30* (2013.01); *G01B 7/004* (2013.01); *G01D 5/145* (2013.01)

(58) Field of Classification Search
CPC ........... G01B 7/30; G01B 7/004; G01D 5/145
See application file for complete search history.

(56) References Cited

U.S. PATENT DOCUMENTS

| | | | | |
|---|---|---|---|---|
| 2004/0061619 A1* | 4/2004 | Kim | ................... | G02B 26/0841 340/686.1 |
| 2006/0152740 A1* | 7/2006 | Cavallucci | ............ | G06F 3/0421 356/614 |
| 2011/0140690 A1* | 6/2011 | Antraygue | .............. | B64C 13/04 324/207.25 |
| 2016/0018483 A1* | 1/2016 | Oren-Pines | ........ | G01R 33/0041 324/252 |
| 2017/0186454 A1* | 6/2017 | Asakura | ............ | G11B 5/59627 |

FOREIGN PATENT DOCUMENTS

DE 102014110019 A1 6/2015

OTHER PUBLICATIONS

German Patent Office, Office Action issued for DE 102016108846.3, dated Mar. 27, 2017, 6 pgs.
J.F. Gregg, et al., "Spin Electronics—A Review", IOP Publishing Ltd., 121 pgs., 2002.

* cited by examiner

*Primary Examiner* — Dominic E Hawkins
(74) *Attorney, Agent, or Firm* — Schiff Hardin LLP (57) ABSTRACT

An angle sensor arrangement is proposed, said angle sensor arrangement including at least two sensor substrates arranged in such a way that they assume different angular orientations in relation to an axis of rotation, wherein at least one sensor substrate comprises two magnetic field sensor elements arranged in such a way that they assume different angular orientations in relation to the axis of rotation, and comprising a combining device, on the basis of which a linear combination of the magnetic field quantities measured by the two magnetic field sensor elements is determinable. Furthermore, a method for calibrating or operating an angle sensor arrangement is specified.

19 Claims, 5 Drawing Sheets

ANGLE SENSOR ARRANGEMENT AND METHOD FOR THE ANGLE SENSOR ARRANGEMENT

The invention relates to an angle sensor arrangement and a method for such an angle sensor arrangement.

Figure 1:
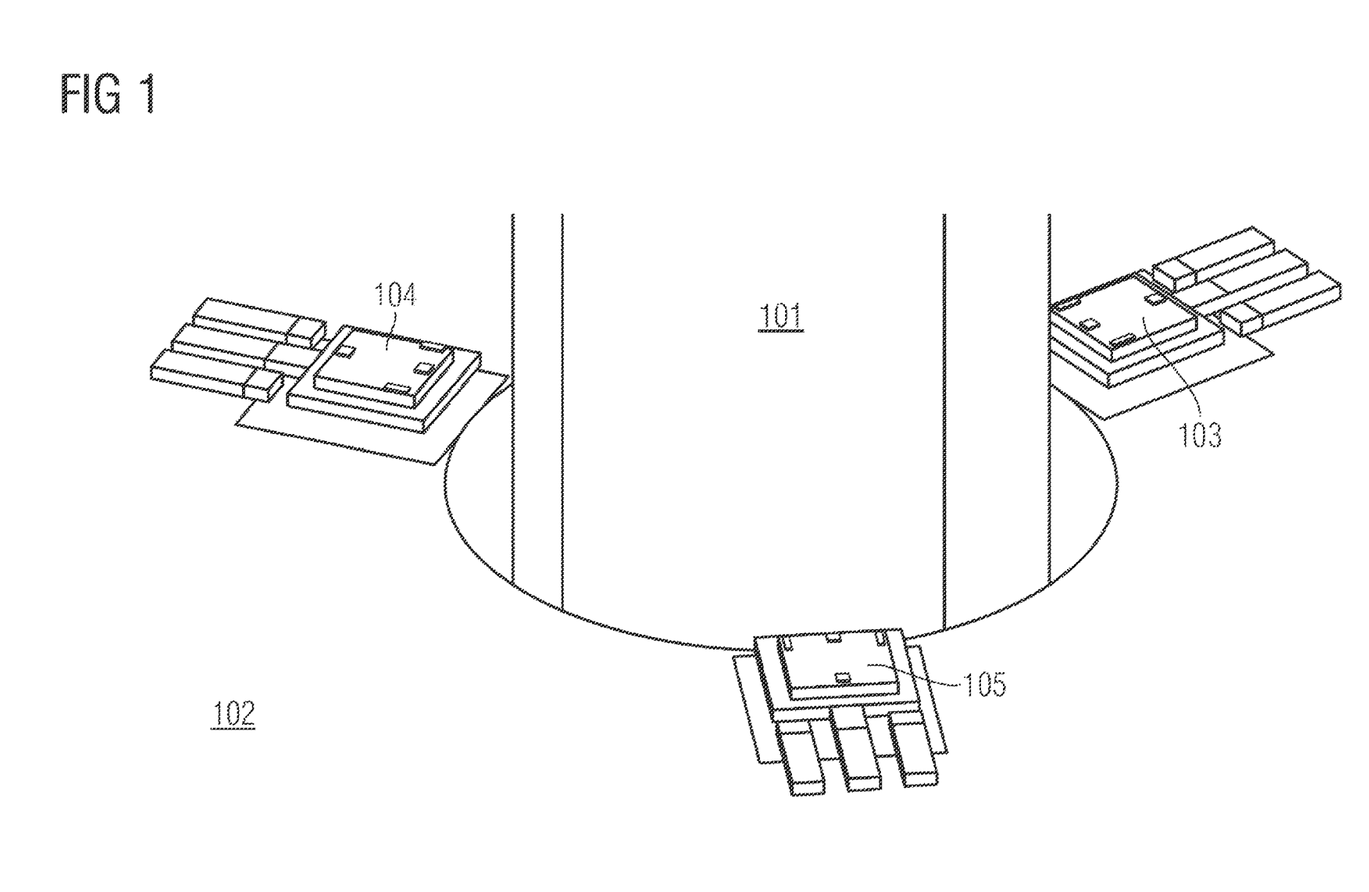
FIG. 1 shows an exemplary sensor arrangement with a shaft which is guided through a plate, with three sensor components being arranged on the plate.

Sensor arrangements in which a permanent magnet is fastened to a rotatable shaft and in which a plurality of sensor components are arranged in a regular pattern on a circle centered on the axis of rotation are known. FIG. 1 shows an exemplary sensor arrangement comprising a shaft 101 which is guided through a plate 102, with three sensor components 103 to 105 being arranged on the plate 102. The sensor components 103 to 105 lie on a straight line through the center point of the shaft 101, with these straight lines having an angle of 120 degrees in relation to the two adjacent straight lines. Arranged above (or below) the sensor components 103 to 105 is a permanent magnet which is connected to the shaft 101 and rotates with the latter (this permanent magnet has not been depicted in FIG. 1).

The sensor component is also referred to as a "satellite". In many applications, the geometric extent of the arrangement shown in FIG. 1 is too large to allow a plurality of satellites to be housed on a single semiconductor chip or in a usual housing for integrated electronic components in a cost-effective manner Thus, for example, the shaft 101 has a diameter in a range of 5 mm to 30 mm, the satellites lying on a larger circle around the shaft, which has a diameter of at least 10 mm Hence, the distances between adjacent sensors on the circle (the so-called reading circle) are $$\pi \cdot 10 \text{ mm} \cdot \frac{1}{3} \approx 10 \text{ mm,}$$

which is usually too large to house a plurality of satellites together on a chip or in a sensor housing.

However, if the satellites are on different semiconductor chips, there are non-negligible positioning errors of the satellites in relation to one another on account of the assembly or placement of the individual semiconductor chips. These positioning errors become greater if the satellites are housed in different sensor housings.

If the permanent magnet rotates with a constant speed, each satellite sees a sinusoidal curve or at least a curve that is similar to sine curve for the magnetic field. If adjacent satellites are arranged offset from one another by a certain angle (e.g. 120 degrees) on the reading circle, the signals thereof have a corresponding phase shift in the time domain which, in turn, may be transformed into the angle domain. If the satellites are positioned exactly, the signals recorded thereby have exactly the same phase shift in the angle domain as the angle offset in the geometric arrangement, 120 degrees in this example here. The sensor system is able to determine the angular position of the permanent magnet by comparing the signals determined by the satellites.

However, the aforementioned positioning errors of the satellites lead to a falsification of the phase shift of the satellite signals. If the sensor system does not know the positioning errors, this has an error in the ascertained angular orientation of the magnet as a consequence. By way of example, if the reading circle has a radius of 20 mm and a satellite has been misplaced by 0.5 mm in the tangential direction, this corresponds to an error in the phase shift to the next satellite of $$\frac{0.5 \text{ mm}}{20 \text{ mm}} \cdot \frac{180}{\pi} = 1.4°.$$

Now, if an accuracy of better than 1 degree is required, this error is too large.

Accordingly, it is an object to increase the accuracy or reduce, or at least partly compensate, the positioning error.

This object is achieved in accordance with the features of the independent claims. Preferred embodiments may be gathered, in particular, from the dependent claims.

In order to achieve the object, an angle sensor arrangement is proposed, said angle sensor arrangement comprising
at least two sensor substrates arranged in such a way that they assume different angular orientations in relation to an axis of rotation,
wherein at least one sensor substrate comprises two magnetic field sensor elements arranged in such a way that they assume different angular orientations in relation to the axis of rotation,
a combining device, on the basis of which a linear combination of the magnetic field quantities measured by the two magnetic field sensor elements is determinable.

In particular, the magnetic field sensor elements may be such that they each provide a signal. These provided signals are combined by the combining device.

By way of example, it is an option for the linear combination to have an adjustable coefficient c; hence, the coefficient c may be a variable, adjustable value and, optionally, not a fixedly predetermined value.

In particular, the sensor substrate is a satellite which, for example, is arranged on a reading circle or in the vicinity of the reading circle. In particular, the reading circle extends concentrically around the axis of rotation.

In an exemplary arrangement, the axis of rotation extends in the z-direction, the reading circle extends concentrically about the axis of rotation in the xy-plane and the satellite is positioned on the reading circle or in the vicinity of the reading circle. Here, the x-, y- and z-axes are axes of the Cartesian coordinate system.

By way of example, at least one of the satellites comprises at least two magnetic field sensor elements. The magnetic field sensor element may be any type of magnetic field sensor or comprise the latter.

The combining device may be part of one of the sensor substrates, or else be embodied separately from the latter. In particular, it is an option for the sensor substrate with the (at least) two magnetic field sensor elements to comprise at least a part of the combining device. Within this meaning, the combining device may be embodied in a manner distributed among a plurality of components. It is also an option for the combining device to have a central component which is positioned separately from the sensor substrates. The combining device may be embodied as a semiconductor circuit, e.g. an integrated semiconductor circuit.

By way of example, the axis of rotation may be a rotatable shaft.

In particular, the linear combination LK is a combination of the measured magnetic field quantities $B_1$, $B_2$, where each one of the magnetic field quantities may be multiplied by a coefficient $c_1$, $c_2$. By way of example, the linear combination LK results as:

$$LK = c_1 \cdot B_1 + c_2 \cdot B_2.$$

In particular, it is possible that only a single coefficient c is used; with this, e.g. the relationship for the linear combination LK emerges as:

$$LK = (1-c) \cdot B_1 + c \cdot B_2.$$

In one development, an element is coupled or coupleable to, or around, the axis of rotation, said element having a magnetic field source.

By way of example, a permanent magnet may be arranged on the axis of rotation. The magnetic field acting on the sensor substrates is modified by rotating the element about the axis of rotation. As a result, it is possible to determine e.g. the position (angle) of the axis of rotation, in particular on account of the linear combination of the magnetic field quantities, which is determined on the basis of the magnetic field sensor elements.

In one development, the at least two sensor substrates are rigidly connected, or connectable, to one another by way of a functional element.

This ensures that the angular positions which the sensor substrates assume in relation to the axis of rotation are (largely) constant. By way of example, the functional element may be a frame, on which the sensor substrates (satellites) are positioned relative to one another and relative to the axis of rotation.

In one development, the magnetic field sensor elements are arranged at a distance from one another.

In one development, the magnetic field sensor elements are of the same sensor type.

In one development, the sensor type is one of the following sensor types:
an MR sensor,
an AMR sensor,
a GMR sensor,
a TMR sensor,
a Hall sensor,
a Hall plate or a vertical Hall sensor,
a MAG-PET.

In one development, the magnetic field sensor elements have a distance of at least 300 μm, at least 500 μm or at least 1 mm on the sensor substrate.

In practice, it may be advantageous to position the magnetic field sensor elements as far apart as is allowed by the largest position tolerances. By way of example, an incorrect placement (position tolerance) may be e.g. 0.5 mm in the case of automatically mounting printing plates. The entire printing plate, for example, may once again be incorrectly positioned by 0.5 mm to 1 mm in relation to the axis of rotation, with the plate position preferably being taken into account within the scope of an in-situ calibration.

In one development, the magnetic field sensor elements are spaced apart from one another on the sensor substrate by a distance which is greater than the dimension of the respective magnetic field sensor element.

By way of example, if the magnetic field sensor elements have a dimension (length) of 1 mm, the distance between the magnetic field sensor elements may be more than 1 mm. If the magnetic field sensor elements have different sizes, the distance between the magnetic field sensor elements may be greater than the largest (longest) one of the two magnetic field sensor elements.

In one development, the sensor substrate is a semiconductor element, in particular a chip.

In one development, the linear combination is determined by means of a plurality of coefficients, wherein at least one of the coefficients is stored in a memory.

In one development, the memory is programmed after the at least two sensor substrates are rigidly coupled to one another.

In particular, the memory becomes programmable after the sensor substrates were arranged in a housing. This facilitates a more accurate calibration of the angle sensor arrangement.

In one development, the sensor substrates are arranged parallel or substantially parallel to one another.

By way of example, incorrect positionings may arise if all sensor substrates are assembled on a common carrier (e.g. frame, assembly plate). The true (effective) position of a sensor may be displaced on the surface of the sensor substrate as a result of weighting the signals of different magnetic field sensor elements per sensor substrate. Thus, for example, it is possible for the sensor substrates to lie (substantially) flat on the carrier and the incorrect positionings of the sensor substrates may be compensated for e.g. by means of software and/or hardware, at least proportionally on the basis of the weighting of the signals per sensor substrate.

To this end, the carrier, in particular, is embodied parallel to the sensor substrates.

In particular, the magnetic field sensor elements may be arranged (mounted) on a chip (the sensor substrate) in SMD construction.

It is also an option for the sensor substrates to be arranged perpendicular, or substantially perpendicular, to the axis of rotation. Another option consists of the sensor substrates being positioned in the z-direction (standing erect) in relation to the axis of rotation; in this case, the sensor substrates could be arranged tangentially on the reading circle.

A method is also proposed for calibrating or operating an angle sensor arrangement,
wherein the angle sensor arrangement comprises:
at least two sensor substrates arranged in such a way that they assume different angular orientations in relation to an axis of rotation,
wherein at least one sensor substrate comprises two magnetic field sensor elements arranged in such a way that they assume different angular orientations in relation to the axis of rotation,
a combining device, configured in such a way that the following steps are performable:
determining a linear combination of the magnetic field quantities measured by the two magnetic field sensor elements,
storing at least one coefficient of the linear combination in a memory after the at least two sensor substrates are rigidly coupled to one another.

In one development, the linear combination is determined by virtue of a value for at least one coefficient of the linear combination being determined.

In one development, the value for the at least one coefficient is determined by virtue of different values being tested and the value for which the difference between spatial angle offset of the sensor substrates and measured phase shift is minimal in terms of quantity being selected.

In particular, the difference between nominal spatial angle offset of the sensor substrates and measured phase shift may be minimal in terms of quantity.

In one development, the value for the at least one coefficient is determined by virtue of different values being tested and an optimized value being determined by means of an interpolation between these different values.

In one development, the coefficient is determined from the phase angles of the signals of the two magnetic field sensor elements relative to a nominal phase angle of the sensor substrates, wherein the nominal phase angle corresponds to a nominal spatial angle offset of the sensor substrates.

By way of example, the nominal phase angle is an ideal phase angle. By way of example, the ideal phase angle corresponds to a position of the substrate in a system with N substrates at those angular positions which are an integer multiple of 360°/N, i.e. at 0°, 120°, 240° for N=3 for example.

In one development, a calibration magnet is provided for calibration purposes.

In one development, the two magnetic field sensor elements are arranged on a common semiconductor chip.

The explanations made above in relation to the apparatuses apply correspondingly to the method, and vice versa.

The above-described properties, features, and advantages, as well as the manner in which they are achieved, are explained in more detail in conjunction with the following schematic description of exemplary embodiments, which are explained in more detail in conjunction with the drawings. Here, the same elements or elements with the same effect may be provided with the same reference sign for reasons of clarity.

By way of example, a calibration of a sensor arrangement is proposed for achieving the aforementioned object. Here, the sensor arrangement comprises a sensor module (comprising a frame on which the satellites are positioned relative to one another and relative to a rotatable shaft, and the satellites) and a calibration magnet, the angular position of which is changeable and known (e.g. by way of an angle reference sensor). Here, it is not necessary for the shaft or the magnet, the angular position of which is subsequently intended to be determined by means of the sensor arrangement, to be present during the calibration.

Furthermore, e.g. one semiconductor circuit (e.g. an integrated semiconductor circuit) per satellite is proposed for achieving the objectives, said semiconductor circuit having magnetic field detectors at at least two positions on the semiconductor circuit (also referred to as a "chip"), with these positions corresponding to different angular positions in the sensor module; by way of example, the two positions are arranged remote from one another at a distance which corresponds to a maximum tangential positioning error of the satellites in the sensor module. The two magnetic field detectors supply the magnetic fields B1 and B2. Further, a combining device is provided as part of the semiconductor circuit, said combining device forming a signal $$(1-c) \cdot B1' + c \cdot B2',$$

where
 B1' is a magnetic field derived from the magnetic field B1,
 B2' is a magnetic field derived from the magnetic field B2,
 c is a trim coefficient, selected in such a way that the phase shift of the satellites corresponds to the geometric angle offset at the reading circle.

Furthermore, the sensor module may comprise a memory in which the trim coefficient c is stored after having been ascertained and made available to the sensor system for calculating the angular orientation of the magnet.

Explanation: "Magnetic Field Detector"

The magnetic field is a vector field which assigns a vector of the magnetic field to each point in three-dimensional space. This vector may be decomposed into 3 mutually orthogonal components, e.g. x-, y-, z-components in the Cartesian coordinate system, or r-, φ-, z-components in the circular cylindrical coordinate system.

Furthermore, other magnetic field quantities may be derived from the magnetic field, e.g. a length of a magnetic field vector, a direction in which the magnetic field vector points, or a direction, in which a projection of the magnetic field vector onto a reference plane (e.g. a chip surface) points.

Such quantities are transformable into one another and therefore comprise a common information item, from which, for example, it is possible to draw conclusions about an angular orientation of the rotatably mounted permanent magnet.

In accordance with one example, a Hall plate measures a component of the magnetic field perpendicular to this plate, a magnetoresistive sensor measures the cosine of the angle between the projection of the magnetic field vector onto the surface of the sensor (i.e. the chip surface) and a reference direction. In the case of an AMR sensor, this reference direction is determined by a current flow direction in the AMR sensor; in the case of a GMR or TMR sensor, said reference direction is determined by the direction of a reference magnetization in a so-called "pinned layer" of the GMR or TMR sensor. In particular, this "pinned layer" is a reference magnet layer with an inscribed magnetization. Details in respect of the "pinned layer" are described in e.g. [J F Gregg, I Petej, E Jouguelet and C Dennis: "Spin electronics—a review", J. Phys. D: Appl. Phys. 35 (2002) R121-R155].

Hence, Hall plate and MR sensor are able to detect different quantities of the magnetic field. The approach described here is applicable, in general, for different detectable or derivable quantities of the magnetic field.

Hence, for example, the magnetic field detector represents a detector for a quantity of the magnetic field vector at a point in three-dimensional space. Further, it is possible to determine that this quantity is defined by three orthogonal components, or fewer, of the magnetic field vector and, optionally, by additional directions, such as e.g. reference directions or alignments of surfaces in space, and hence said quantity is calculable.

Explanation: "Test Point" of the Detector

The test point of the detector is that point in three-dimensional space at which the detector detects the measured quantity.

Explanation: "Effective Test Point" of the Magnetic Field Detector

By way of example, the magnetic field varies in space, i.e., for example, along a path on the surface of a sensor chip. In comparison with the overall arrangement comprising a plurality of satellites, a rotatable shaft, and a permanent magnet assembled on the shaft, the sensor chip is small. In this respect, the assumption may be made that the change in the magnetic field over the surface of the sensor chip is small. Therefore, it is possible for this change over the surface to be linearized as an approximation.

Figure 2:
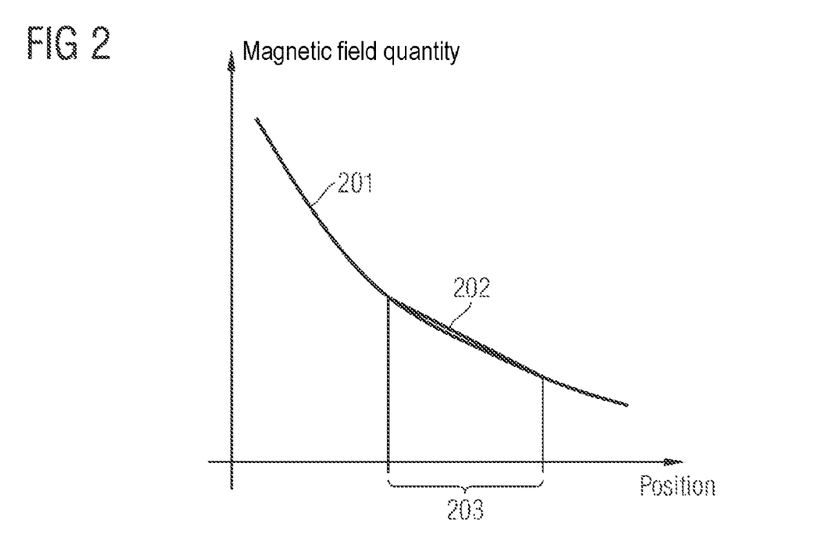
FIG. 2 shows, in an exemplary manner, a diagram which elucidates a relationship between magnetic field quantity and position.

FIG. 2 shows, in an exemplary manner, a diagram which elucidates a relationship between magnetic field quantity and position. A curve 201 shows a (nonlinear) profile of the magnetic field quantity in view of the position. The semiconductor chip extends over a range 203 (of the position) in an exemplary manner Within this range, the curve 201 may be assumed to have a linear profile. This is represented by the straight line 202, which represents a linearized approximation of the curve 202 in the position range of the chip.

Furthermore, it is possible for two sensor elements A and B (detectors) to be situated at different positions P1 and P2 on the semiconductor chip. The sensor element A detects a magnetic field quantity B1 at the position P1 and the sensor element B detects a magnetic field quantity B2 at the position P2. The positions P1 and P2 are also referred to as a test point in each case. This relationship is visualized in FIG. 3.

Figure 3:
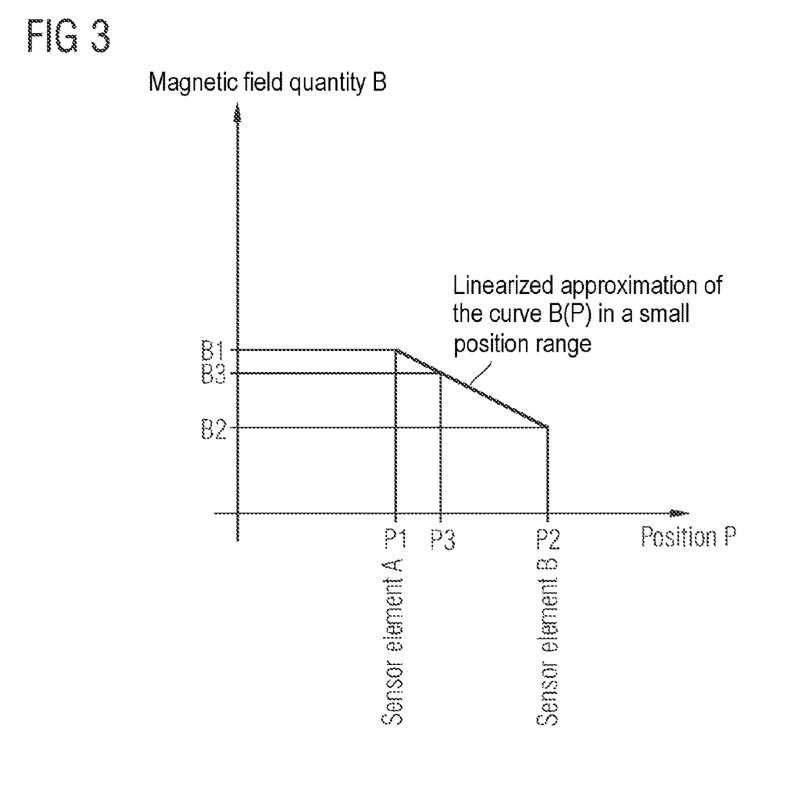
FIG. 3 shows, on the basis of the diagram in FIG. 2, a linearized approximation of the magnetic field B in a position range between two positions P1 and P2.

Under the assumption of the linear interpolation, a corresponding value for the magnetic field quantity may be ascertained for each position between the two test points A and B: a straight line equation emerges, said straight line extending through the points (P1, B1) and (P2, B2) in the (P, B)-plane:

$$B = B1 + (P - P1) \cdot \frac{B2 - B1}{P2 - P1}.$$

By way of example, this can be used to ascertain a magnetic field quantity B3 at the location P3 in accordance with:

$$B3 = B1 + (P3 - P1) \cdot \frac{B2 - B1}{P2 - P1}.$$

Even though the sensor elements A and B are placed at the test points P1 and P2, the magnetic field may be estimated or approximately determined at the test point P3 by means of this interpolation. In some respects, this corresponds to a measurement at the test point P3, without a sensor element being arranged there. By way of example, the field at the test point P3 may be ascertained by means of software in the sensor module, without this requiring a change in the position of the sensor elements.

The equation above may be rewritten as follows:

$$B3 = (1 - c) \cdot B1 + c \cdot B2 \quad (1)$$

where $$c = \frac{P3 - P1}{P2 - P1}.$$

Hence, the respective coefficients (1-c) and c are used for percentage weighting of the magnetic field quantities B1 and B2, with the sum of the coefficients equaling one:

$$(1-c)+c=1.$$

If the coefficient c=0.5, the following emerges:

$$B3 = 0.5 \cdot B1 + 0.5 \cdot B2 = \frac{B1 + B2}{2}.$$

Hence, the test point P3 emerges as $$P3 = \frac{1}{2} \cdot (P1 + P2).$$

If c=0, B3=B1 and P3=P1; if c=1, B3=B2 and P3=P2.

Thus, if the value c migrates from 0 to 1, this leads to a shift in the effective test point from the point P1 to the point P2.

If the straight line also still provides a good approximation for the actual magnetic field quantity outside of the position range between the points P1 and P2, it is possible to displace the effective test point outside of the range between the points P1 and P2. If the effective test point is displaced to positions on the left of the point P1, the coefficient c becomes less than 0: by way of example, a coefficient c=−0.5 corresponds to the effective test point position $$P_{\mathit{eff}} = P1 - \frac{P2 - P1}{2}.$$

In general, the relationship between the effective test point position Par and the coefficient c is given by:

$$c = \frac{P_{\mathit{eff}} - P1}{P2 - P1}.$$

If two sensor elements are positioned on the semiconductor chip with a spacing of 1 mm, the magnetic field quantity may be estimated not only at arbitrary points on a straight line between the two sensor elements, but also on the same straight line outside of the two sensor elements. Here, the accuracy of the estimate is sufficiently good, in particular, if the actual profile of the magnetic field quantity follows a straight line equation as exactly as possible. This is often ever less the case with increasing distance from the points P1 and P2, and so such an estimate preferably is carried out at a small distance from the points P1 and P2.

An alternative calculation in place of equation (1) is:

$$B3' = B1 + \frac{c}{1 - c} \cdot B2. \quad (2)$$

Subsequently, it is possible to set $$B3=(1-c) \cdot B3' \quad (3).$$

In this case, the weighting with two coefficients, the sum of which is one, is obscured. The property of the two coefficients only reemerges in the combination of equations (2) and (3).

It is also an option to combine the prescription in accordance with equation (3) with e.g. other calculations, for example of a temperature compensation.

The approach may also be applied to a multiplicity of sensor elements. By way of example, three sensor elements may be arranged in a plane in such a way that they do not lie on a common straight line. In such an example, the magnetic field quantity may be interpolated or extrapolated at all points in this plane by different weighting of the measurement values from the three sensors, with the accuracy of the approximation increasing, the closer the actual profile of the magnetic field quantity over the position in this plane corresponds to a linear relationship.

By way of example, a Cartesian coordinate system with orthogonal x- and y-axes may be defined in the plane of the semiconductor chip. By way of example, sensor elements S1, S2, and S3 are positioned on the following positions (x, y):

sensor element S1: (0, 0),
sensor element S2: (1 mm, 0),
sensor element S3: (0, 1 mm).

By way of example, the profile of the magnetic field quantity B is assumed to be linear in accordance with the following equation:

$$B = c_0 + c_x \cdot x + c_y \cdot y.$$

Accordingly, the following applies for the magnetic field quantities at the locations of the sensor elements:

magnetic field quantity B1 at the location of the sensor element S1:

$$B1 = c_0.$$

magnetic field quantity B2 at the location of the sensor element S2:

$$B2 = c_0 + c_x \cdot 1 \text{ mm}.$$

magnetic field quantity B3 at the location of the sensor element S3:

$$B3 = c_0 + c_y \cdot 1 \text{ mm}.$$

It follows from this:

$$c_0 = B1,$$
$$c_x = \frac{B2 - B1}{1 \text{ mm}},$$
$$c_y = \frac{B3 - B1}{1 \text{ mm}},$$

as a result of which, the magnetic field at a test point $P_{\textit{eff}}$ with the coordinates $(x_{\textit{eff}}, y_{\textit{eff}})$ is determined by:

$$B = c_0 + c_x \cdot x + c_y \cdot y = B1 + \frac{B2 - B1}{1 \text{ mm}} \cdot x_{\textit{eff}} + \frac{B3 - B1}{1 \text{ mm}} \cdot y_{\textit{eff}}.$$

This relationship can be rewritten as $$B = B1 \cdot \left(1 - \frac{x_{\textit{eff}}}{1 \text{ mm}} - \frac{y_{\textit{eff}}}{1 \text{ mm}}\right) + B2 \cdot \frac{x_{\textit{eff}}}{1 \text{ mm}} + B3 \cdot \frac{y_{\textit{eff}}}{1 \text{ mm}}$$

or $$B = B1 \cdot (1 - c_x - c_y) + B2 \cdot c_x + B3 \cdot c_y.$$

This once again corresponds to a weighted sum of the measurement values of the three sensor elements, with the sum of the coefficients equaling one:

$$(1 - c_x - c_y) + c_x + c_y = 1.$$

The values for the coefficients $c_x$ and $c_y$ lie between 0 and 1 if the effective test point lies in a range between 0 and 1 mm. If the value of the coefficient $c_x$ is less than zero, the effective test point lies at a negative x-coordinate; if the value of the coefficient $c_x$ is greater than 1, the effective test point lies at an x-coordinate which is greater than 1 mm. This applies correspondingly to the coefficient $c_y$ and the y-coordinate emerging therefrom.

Compensation of an Angle Error

There are explanations below as to how an angle error, which emerges as a consequence of a position tolerance, may be at least partly reduced by means of displacing the effective test point. Here, it should be noted that "compensation" may relate to a complete compensation or a partial compensation of the error.

Figure 4:
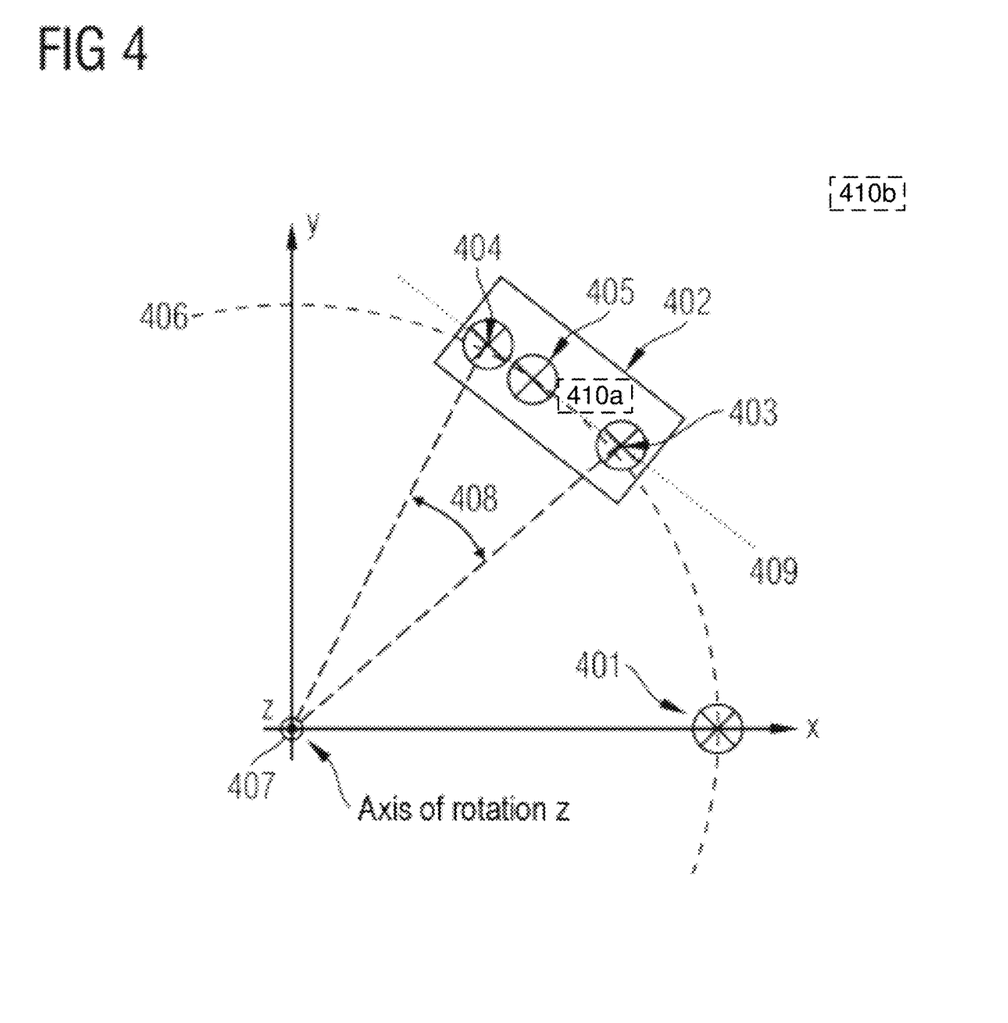
FIG. 4 shows a schematic illustration of an exemplary arrangement comprising an angle sensor which is arranged away from an axis of rotation ("off axis")

FIG. 4 shows a schematic illustration of an exemplary arrangement comprising an angle sensor which is arranged away from the axis of rotation ("off axis"). The arrangement has two satellites 401 and 402 in an exemplary manner. Each satellite 401, 402 is such that it measures the magnetic field quantity at a test point. The test points of both satellites 401, 402 lie on a reading circle 406, the center of which corresponds to the axis of rotation 407. FIG. 4 depicts a plan view, i.e. the axis of rotation 407 extends perpendicular to the plane of the drawing through the origin of the xy-coordinate system. In FIG. 4, the satellite 401 is depicted as an ideal position of this satellite in an exemplary manner.

The satellites 401, 402 are situated on different semiconductor chips (also referred to as "chips"). By way of example, this is due to a distance between the two satellites being too large to arrange them efficiently on a common chip.

Each satellite 401, 402 comprises two sensor elements. This is depicted in an exemplary manner for the satellite 402, which has the sensor elements 403 and 404. The sensor elements 403 and 404 have a distance from one another which is aligned in such a way that the two sensor elements 403, 404 assume a different angular orientation 408. This angular orientation 408 is determined by an angle between the straight lines through the origin of the xy-coordinate system and by the respective sensor element 403, 404.

In a preferred case, the chip or the satellite 402 is aligned in such a way that a straight line 409, on which the two sensor elements 403 and 404 lie, is tangential to the reading circle 406.

In particular, it is advantageous if the two sensor elements 403, 404 do not lie on the same straight line through the axis of rotation.

In FIG. 4, the satellite 402 has not been positioned exactly in an exemplary manner because the center thereof does not come to rest at an ideal position 405 of the test point of the satellite 402.

Deviating from the ideal position 405, the satellite 402 is displaced slightly too far in the clockwise direction on the reading circle 406. However, such an incorrect positioning may be compensated, at least in part, by the linear combination of the measurement values from the two sensor elements 403 and 404 using the combining device 410a or 410b. In the example shown in FIG. 4, the measurement value of the sensor element 404 is multiplied by a coefficient greater than 0.5 and the measurement value of the sensor element 403 is multiplied by a coefficient less than 0.5.

The sum of these two coefficients once again yields 1. To put it illustratively, the measurement value of the sensor element 404 may be taken into account with a weighting of 70% and the measurement value of the sensor element 403 may be taken into account with a weighting of 30% in order to arrive at the interpolated measurement value at the point of the ideal position 405.

Example for a Calibration:

By way of example, a specific calibration may be carried out taking into account at least some of the following steps:

(1) The satellites are fastened to, in, or on a common frame.
By way of example, the frame may be a functional element which ensures a rigid geometric arrangement of the satellites with respect to one another. By way of example, a lattice-shaped or frame-shaped structure (e.g. a lead frame), a printing plate, a glass plate, a substrate or the like may be used as a frame. Electrical connections between the satellites and/or between the satellites and an evaluation circuit are established. The composite of satellites and frame may also be referred to as sensor module. Here, the evaluation circuit may be part of the sensor module. It is also an option for part of the evaluation circuit to be part of the sensor module. In particular, the evaluation circuit may be distributed among sensor modules or part of the evaluation circuit may be distributed among sensor modules.

(2) The sensor module is installed at a rotatable shaft in an exemplary manner. In particular, the rotatable shaft comprises a magnet. By way of example, the shaft and/or the magnet may be part of a specific test or calibration apparatus. The shaft and/or the magnet are therefore not necessarily the respective shaft and/or the respective magnet which is used in a (subsequent) application together with the sensor module.

However, individual cases in which the shaft and/or the magnet are the components of the application which are used in combination with the sensor module during use are possible by all means.

(3) The shaft is positioned at different angular orientations. To this end, an actuator may be used to move the shaft. Preferably, the angular orientations are known. By way of example, the angular orientations may be determined by a (highly precise) rotary angle sensor which is coupled to the shaft.

(4) The signals of the satellites are read at each one of the predetermined angular orientations. The readout may, for example, be initiated and/or carried out by the satellite itself or by a superordinate evaluation circuit.

(5) The signals of the satellites are normalized.

The sensor elements on different satellites supply different output signals in the case of identical magnetic fields. This is due to the fact that the sensor elements, as a rule, have different sensitivities. This relationship is also referred to as a "sensitivity mismatch". Here, the "sensitivity" denotes a sensitivity in respect of the magnetic field quantity to be measured, i.e. a change in the output signal of the sensor element divided by the change in the magnetic field quantity.

If the magnet is rotated through 360 degrees, each sensor element detects at least a minimum and a maximum. The difference between minimum and maximum is referred to as range. The range of different satellites should be identical in the ideal case, but, as a rule, it is different. In addition to the different sensor elements, the reason may also be found in the different axial and radial positions of the sensors caused by the inaccurate positioning thereof.

Moreover, the sensor elements also have different zero point errors, i.e. the output signal should be zero if a magnetic field quantity vanishes; this is not, or not always, the case on account of tolerances of the sensor elements.

If the magnet is rotated through (precisely) 360 degrees, a zero mean value may be assumed in the magnet arrangement discussed here: if the integral of the magnetic field quantity over the rotation angle is calculated, it equals zero. A difference from zero allows a zero point error of the sensor element to be deduced.

Thus, the integral and the range are initially determined during the normalization (e.g. by means of a discrete Fourier transform). The zero point error and sensitivity mismatch of the sensor elements are determined therefrom. Then, the respective zero point error is subtracted from all signals of the sensor elements and a normalization is carried out in relation to the same sensitivity.

(6) At this stage of the calibration, the assumption may be made that the different satellites produce normalized output signals covering the same value ranges, i.e. they have the same minima and maxima Depending on the angular orientation, the signals are sinusoidal or at least wave-shaped, i.e. they may be output as a Fourier series (i.e. as a sum of sinusoidal signals with different amplitude, phase angle and period).

Furthermore, the satellites produce signals depending on the angular orientation, said signals merging into one another by way of a phase shift, with the phase shift corresponding to the spatial angle offset of the satellites. This phase shift is determined.

(7) If there is a difference between the spatial angle offset of the satellites and the measured phase shift, this difference can be traced back to an incorrect positioning.

In this case, the effective test point in the satellite may be displaced in order to reduce this phase shift.

By way of example, a predetermined number of predetermined values for the coefficient c may be tested, e.g. the following 6 values for c: −0.3; 0; 0.3; 0.6; 0.9 and 1.2. The value of c for which the difference between the spatial angle offset of the satellites and the measured phase shift becomes minimal in terms of quantity may be selected as the best value.

Alternatively, two values for c can be tested and an interpolation can be used to determine which intermediate value would supply a better (e.g. ideal) result. Here, the aforementioned "testing" may be carried out as follows: a value for c is used to influence the effective test point of the satellite; then, the phase shift to the neighboring satellite is measured using this value for c.

By way of example, it is also possible to measure a phase shift $\Delta\varphi_{404}$ between the ideal position 405 of the test point and the location of the sensor element 404. To this end, the phase shift of the signal of the satellite 401 from the signal of the sensor element 404 is measured and a nominal phase shift between the satellite 401 and the ideal position 405 of the test point is subtracted. It is also an option to measure a phase shift $\Delta\varphi_{403}$ between the ideal position 405 and the location of the sensor element 403.

By way of example, the coefficient c may thus be determined as follows:

$$c = \frac{\sin\Delta\varphi_{404}}{\sin\Delta\varphi_{404} - \sin\Delta\varphi_{403}}.$$

For small phase shifts $\Delta\varphi_{403}$, $\Delta\varphi_{404}$, the following applies to a good approximation:

$$c = \frac{\Delta\varphi_{404}}{\Delta\varphi_{404} - \Delta\varphi_{403}}$$

and the signal $B_{402}$ of the satellite 402 is $$B_{402} = B_{404} \cdot (1-C) + B_{403} \cdot c,$$

where $B_{403}$ denotes the magnetic field at the location of the sensor element 403 and $B_{404}$ denotes the magnetic field at the location of the sensor element 404.

Figure 5:
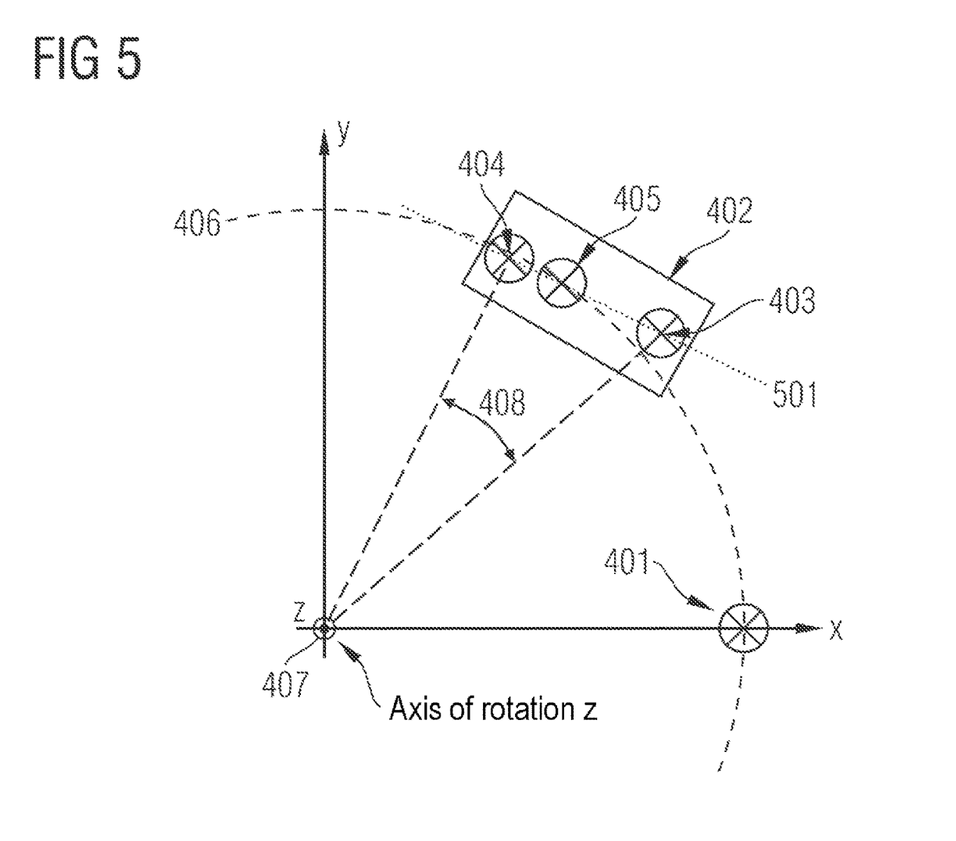
FIG. 5 shows an exemplary arrangement based on the illustration in FIG. 4, in which the straight line, which runs through the sensor elements of the satellite, does not lie tangentially on the reading circle.

In addition, reference should still be made to the fact that the approach described here also works if the straight line on which the two sensor elements lie is not aligned exactly tangentially with respect to the reading circle. FIG. 5 shows an exemplary arrangement, in which a straight line 501 does not lie tangentially on the reading circle. If the magnetic field at the two sensor elements does not have the same strength on account of different radial distances from the axis of rotation, this may be taken into account by the normalization explained above. In view of the remaining reference signs and statements, reference is made to FIG. 4 and the explanations in relation to FIG. 4.

Figure 6:
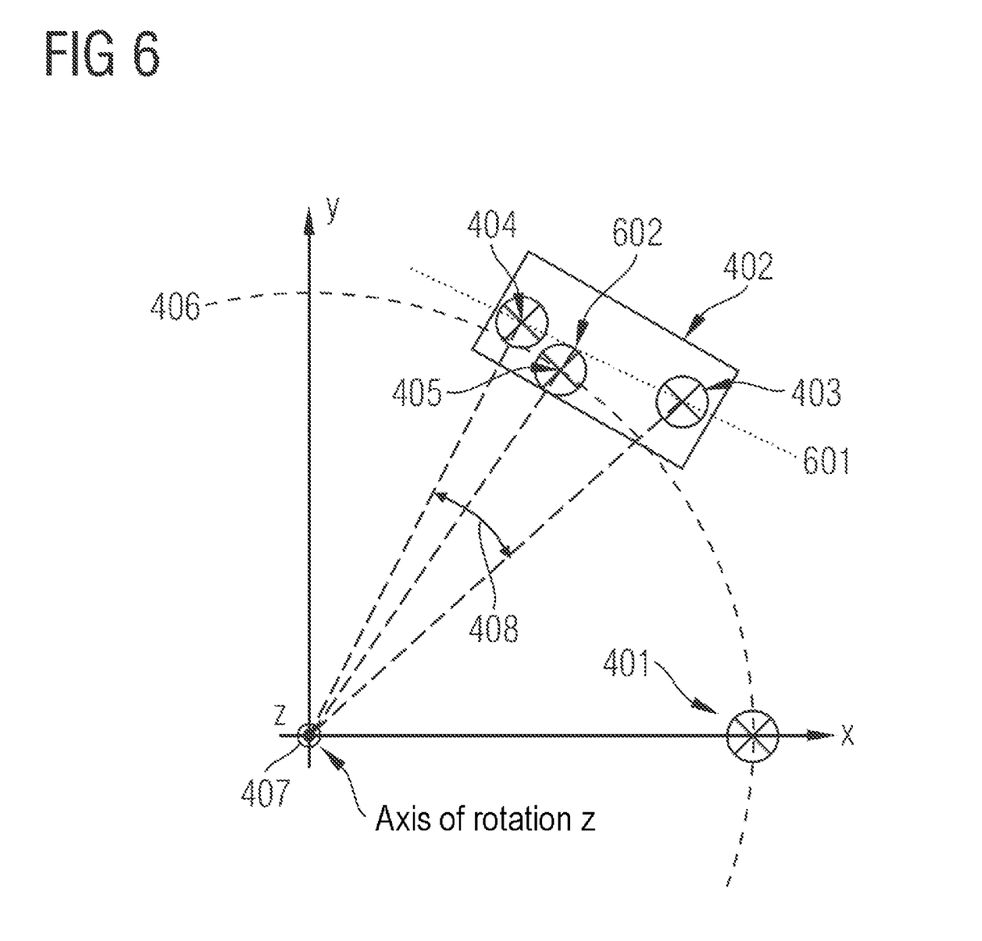
FIG. 6 shows a further exemplary embodiment on the basis of the illustration in FIG. 4, in which the straight line, which runs through the sensor elements of the satellite, does not run to the ideal position of the test point of the satellite because the satellite was positioned too far to the outside in the radial direction.

FIG. 6 shows a further exemplary embodiment on the basis of the illustration of FIG. 4 and the associated explanations. Accordingly, it is also possible for a straight line 601 not to pass through the ideal position 405 of the test point of the satellite 402 if, for example, the chip was positioned too far to the outside in the radial direction. In this case, e.g. the point of intersection of the radial ray through the ideal position 405 and through the straight line 601 emerges as an ideal effective test point 602.

Even though the invention was illustrated more closely and described in detail by the at least one shown exemplary embodiment, the invention is not restricted thereto and other variations may be derived therefrom by a person skilled in the art, without departing from the scope of protection of the invention.

The invention claimed is:

1. An angle sensor arrangement, comprising:
   at least two sensor substrates arranged to assume different angular orientations in relation to an axis of rotation,
   wherein at least one sensor substrate comprises two magnetic field sensor elements arranged to assume different angular orientations in relation to the axis of rotation, and configured to measure magnetic field quantities, and; and
   a combiner configured to determine a linear interpolation of the magnetic field quantities measured by the two magnetic field sensor elements,
   wherein the linear interpolation is used to determine a magnetic field at a position between the two magnetic field sensor elements.

2. The apparatus as claimed in claim 1, wherein an element is coupled or coupleable to, or around, the axis of rotation, said element having a magnetic field source.

3. The apparatus as claimed in claim 1, wherein the at least two sensor substrates are rigidly connected to one another by way of a functional element.

4. The apparatus as claimed in claim 1, wherein the magnetic field sensor elements are arranged at a distance from one another.

5. The apparatus as claimed in claim 1, wherein the magnetic field sensor elements are of the same sensor type.

6. The apparatus as claimed in claim 5, wherein the sensor type is one of the following sensor types: an MR sensor, an AMR sensor, a GMR sensor, a TMR sensor, a Hall sensor, a Hall plate or a vertical Hall sensor, and a MAG-FET.

7. The apparatus as claimed in claim 1, wherein the magnetic field sensor elements have a distance of at least 300 µm, at least 500 µm or at least 1 mm on the sensor substrate.

8. The apparatus as claimed in claim 1, wherein the magnetic field sensor elements are spaced apart from one another on the sensor substrate by a distance which is greater than the dimension of the respective magnetic field sensor element.

9. The apparatus as claimed in claim 1, wherein the sensor substrates are semiconductor chips.

10. The apparatus as claimed in claim 1, wherein the linear interpolation is determined by means of a plurality of coefficients, wherein at least one of the coefficients is stored in a memory.

11. The apparatus as claimed in claim 10, wherein the memory is programmed after the at least two sensor substrates are rigidly coupled to one another.

12. The apparatus as claimed in claim 1, wherein the sensor substrates are arranged to be substantially parallel to one another.

13. A method for calibrating or operating an angle sensor arrangement, the method comprising:
   measuring magnetic field quantities, wherein the measuring is performed by two magnetic field sensor elements arranged to assume different angular orientations on a sensor substrate and in relation to an axis of rotation, the sensor substrate being one of at least two sensor substrates of the angle sensor arrangement and arranged to assume different angular orientations, and the measuring being performed after the at least two sensor substrates are rigidly coupled to one another;
   determining, by a combiner, a linear interpolation of the magnetic field quantities measured by the two magnetic field sensor elements; and
   storing at least one coefficient of the linear interpolation in a memory,
   wherein the linear interpolation is used to determine a magnetic field at a position between the two magnetic field sensor elements.

14. The method as claimed in claim 13, wherein the linear interpolation is determined by virtue of a value for at least one coefficient of the linear interpolation being determined.

15. The method as claimed in claim 14, wherein the value for the at least one coefficient is determined by virtue of different values being tested and the value for which the difference between spatial angle offset of the sensor substrates and measured phase shift is minimal in terms of quantity being selected.

16. The method as claimed in claim 14, wherein the value for the at least one coefficient is determined by virtue of different values being tested and an optimized value being determined by means of an interpolation between these different values.

17. The method as claimed in claim 13, wherein the coefficient is determined from the phase angles of the signals of the two magnetic field sensor elements relative to a nominal phase angle of the sensor substrate, wherein the nominal phase angle corresponds to a nominal spatial angle offset of the sensor substrates.

18. The method as claimed in claim 13, further comprising:
providing a calibration magnet configured to calibrate.

19. The method as claimed in claim 13, wherein the two magnetic field sensor elements are arranged on a common semiconductor chip.

* * * * *